US012581033B2

(12) United States Patent
Kesavan et al.

(10) Patent No.: US 12,581,033 B2
(45) Date of Patent: Mar. 17, 2026

(54) ENFORCING A LIVENESS REQUIREMENT ON AN ENCRYPTED VIDEOCONFERENCE

(71) Applicant: Zoom Video Communications, Inc., San Jose, CA (US)

(72) Inventors: Balachandar Ganesh Kesavan, New York, NY (US); Antonio Marcedone, New York, NY (US)

(73) Assignee: Zoom Communications, Inc., San Jose, CA (US)

( * ) Notice: Subject to any disclaimer, the term of this patent is extended or adjusted under 35 U.S.C. 154(b) by 262 days.

(21) Appl. No.: 18/360,188

(22) Filed: Jul. 27, 2023

(65) Prior Publication Data

US 2024/0275831 A1     Aug. 15, 2024

Related U.S. Application Data

(60) Provisional application No. 63/445,907, filed on Feb. 15, 2023.

(51) Int. Cl.
| | |
|---|---|
| *H04N 7/15* | (2006.01) |
| *H04L 9/08* | (2006.01) |
| *H04L 9/40* | (2022.01) |
| *H04L 51/046* | (2022.01) |
| *H04L 65/1093* | (2022.01) |
| *H04L 65/403* | (2022.01) |
| *H04L 65/80* | (2022.01) |

(52) U.S. Cl.
CPC ............. *H04N 7/15* (2013.01); *H04L 9/0869* (2013.01); *H04L 51/046* (2013.01); *H04L 63/0457* (2013.01); *H04L 65/1093* (2013.01); *H04L 65/403* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 11,258,590 B1 * | 2/2022 | Tsarfati | ................. H04L 9/0825 |
| 11,546,390 B1 | 1/2023 | Boodaei et al. | |

(Continued)

FOREIGN PATENT DOCUMENTS

| | | |
|---|---|---|
| EP | 3301873 A1 | 4/2018 |

OTHER PUBLICATIONS

EP International Search Report and Written Opinion for PCT/US2024/015326 mailed Jun. 6, 2024.

(Continued)

*Primary Examiner* — Quoc D Tran
(74) *Attorney, Agent, or Firm* — Kilpatrick Townsend & Stockton LLP

(57)     ABSTRACT

A liveness requirement can be enforced on a videoconference by performing some techniques described herein. For example, a system can sequentially generate strings during a videoconference. The system can sequentially transmit the strings to a host device associated with a host of the videoconference. The system can receive a communication from the host device during the videoconference. The system can determine whether the communication includes a most recently generated string among the strings. Based on determining that the communication excludes the most recently generated string, the system can discard the communication as outdated.

20 Claims, 7 Drawing Sheets

(56) References Cited

U.S. PATENT DOCUMENTS

| | | | |
|---|---|---|---|
| 2011/0302408 A1* | 12/2011 | McDermott | H04L 65/104 |
| | | | 713/168 |
| 2016/0307165 A1 | 10/2016 | Grodum et al. | |
| 2018/0091407 A1 | 3/2018 | Tervonen et al. | |
| 2020/0044760 A1 | 2/2020 | Seed et al. | |
| 2022/0376895 A1 | 11/2022 | Booth et al. | |
| 2022/0377057 A1* | 11/2022 | Lyons | H04L 63/045 |

OTHER PUBLICATIONS

EP International Search Report and Written Opinion for PCT/US2024/015322 mailed May 29, 2024.
U.S. Appl. No. 18/360,263, "Non-Final Office Action", May 15, 2025, 8 pages.
PCT/US2024/015322, "International Preliminary Report on Patentability", Aug. 28, 2025, 8 pages.
PCT/US2024/015326, "International Preliminary Report on Patentability", Aug. 28, 2025, 9 pages.

* cited by examiner

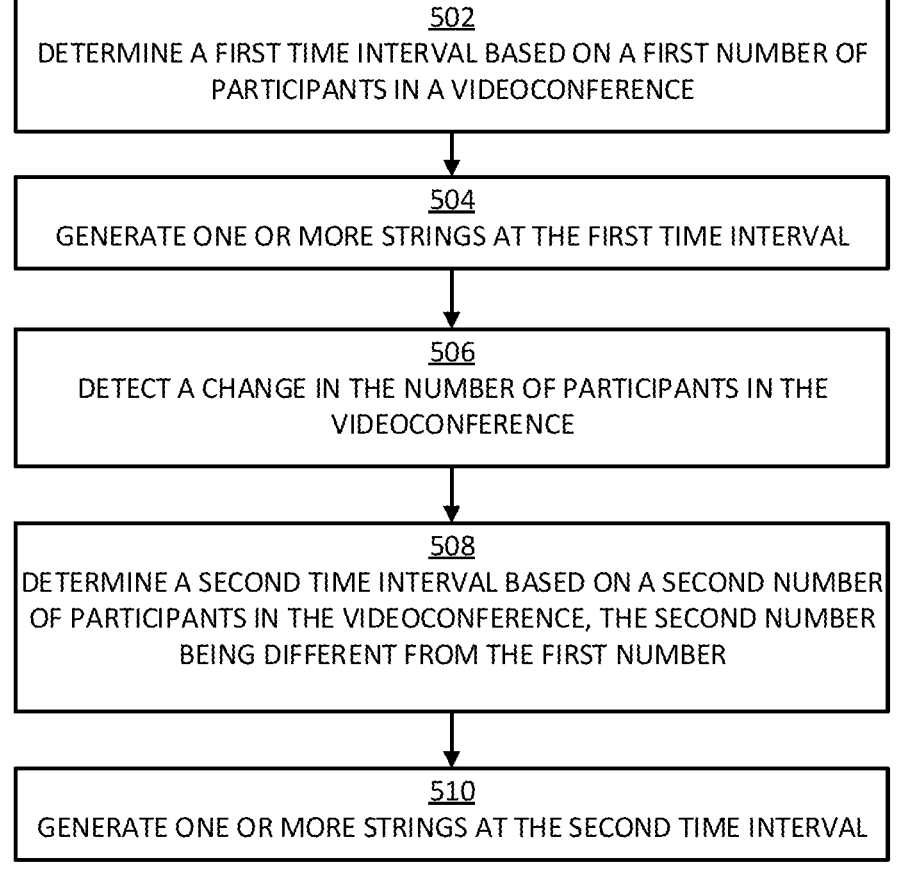

502
DETERMINE A FIRST TIME INTERVAL BASED ON A FIRST NUMBER OF
PARTICIPANTS IN A VIDEOCONFERENCE

504
GENERATE ONE OR MORE STRINGS AT THE FIRST TIME INTERVAL

506
DETECT A CHANGE IN THE NUMBER OF PARTICIPANTS IN THE
VIDEOCONFERENCE

508
DETERMINE A SECOND TIME INTERVAL BASED ON A SECOND NUMBER
OF PARTICIPANTS IN THE VIDEOCONFERENCE, THE SECOND NUMBER
BEING DIFFERENT FROM THE FIRST NUMBER

510
GENERATE ONE OR MORE STRINGS AT THE SECOND TIME INTERVAL

FIG. 5

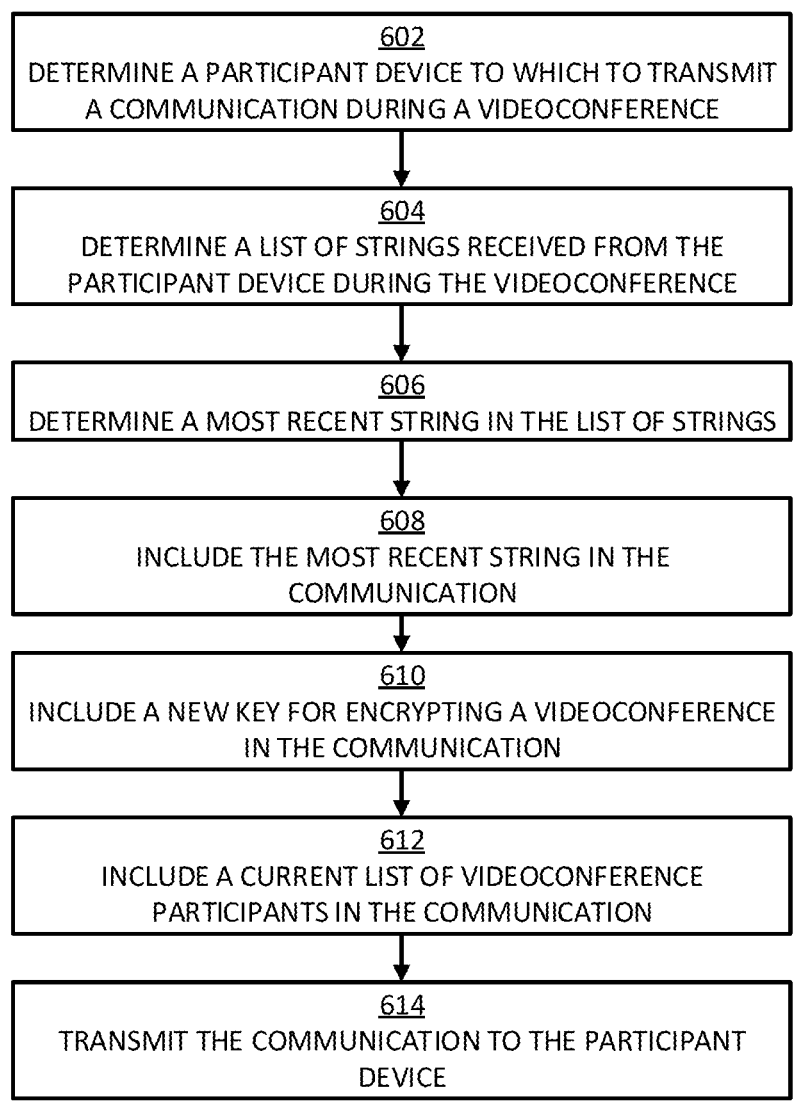

602
DETERMINE A PARTICIPANT DEVICE TO WHICH TO TRANSMIT A COMMUNICATION DURING A VIDEOCONFERENCE

604
DETERMINE A LIST OF STRINGS RECEIVED FROM THE PARTICIPANT DEVICE DURING THE VIDEOCONFERENCE

606
DETERMINE A MOST RECENT STRING IN THE LIST OF STRINGS

608
INCLUDE THE MOST RECENT STRING IN THE COMMUNICATION

610
INCLUDE A NEW KEY FOR ENCRYPTING A VIDEOCONFERENCE IN THE COMMUNICATION

612
INCLUDE A CURRENT LIST OF VIDEOCONFERENCE PARTICIPANTS IN THE COMMUNICATION

614
TRANSMIT THE COMMUNICATION TO THE PARTICIPANT DEVICE

FIG. 6

ENFORCING A LIVENESS REQUIREMENT ON AN ENCRYPTED VIDEOCONFERENCE

CROSS-REFERENCE TO RELATED APPLICATION

This application claims priority to U.S. Provisional Application No. 63/445,907 filed Feb. 15, 2023 and titled "END-TO-END ENCRYPTED ZOOM MEETINGS: PROVING SECURITY AND STRENGTHENING LIVENESS," the entirety of which is hereby incorporated by reference herein.

TECHNICAL FIELD

The present application generally relates to videoconferencing and, more particularly, relates to enforcing a liveness requirement on a videoconference.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

FIG. 5 shows a flowchart of an example of a process for dynamically adjusting such a time interval according to some aspects of the present disclosure.

FIG. 6 shows a flowchart of an example of a process for generating a communication with a string according to some aspects of the present disclosure.

DETAILED DESCRIPTION

Figure 1:
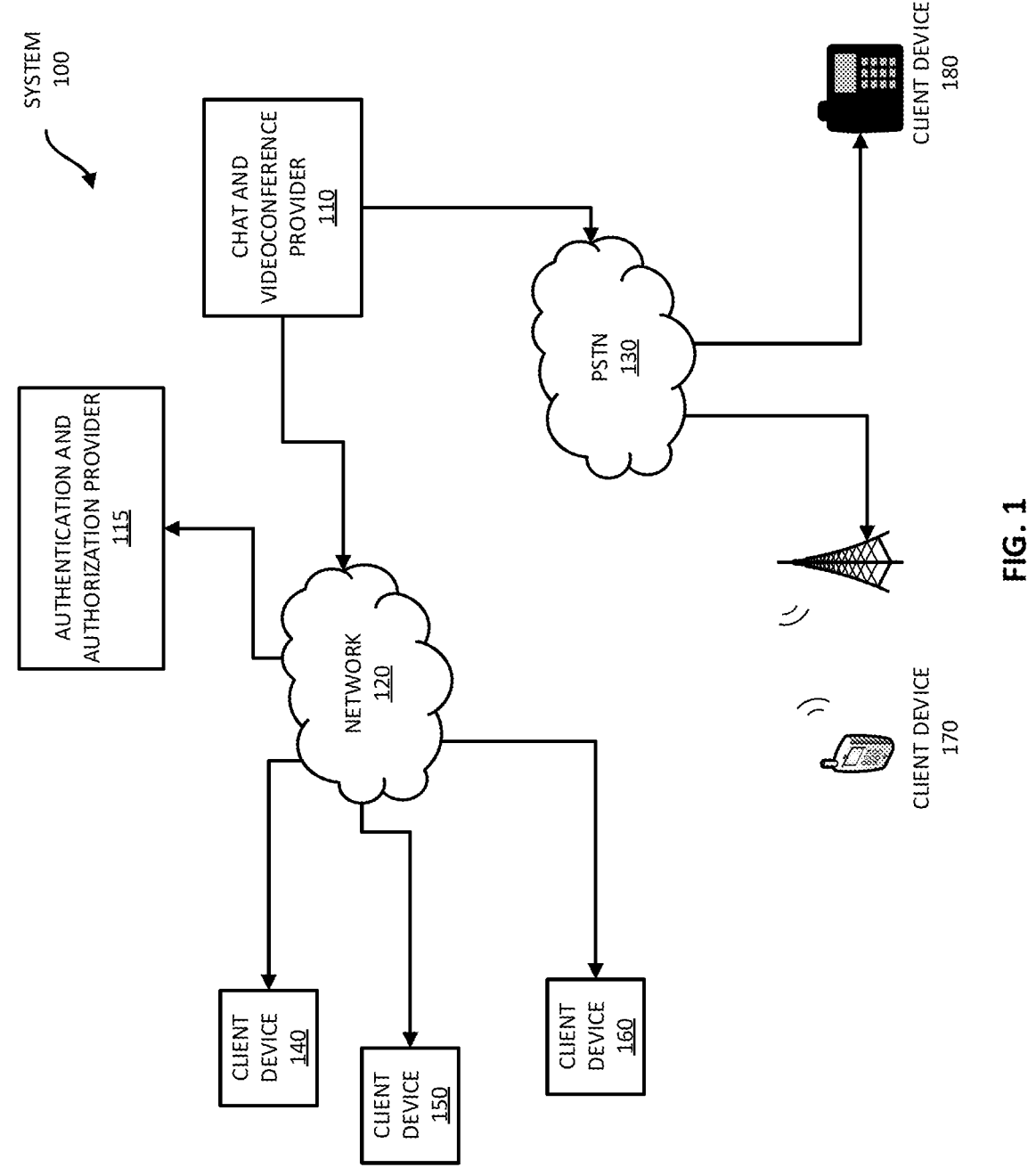
FIG. 1 shows an example of a system for providing videoconferencing and chat functionality to various client devices according to some aspects of the present disclosure.

Examples are described herein in the context of enforcing a liveness requirement on a videoconference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, without having to be at the same physical location. Participants can be invited to a videoconference meeting, join from their personal computers or telephones, and are able to see and hear each other and converse largely as they would during an in-person group meeting or event. In particular, the participants receive media streams (e.g., audio and/or video streams) from the other participants and are presented with them. Using these different modalities, the participants can see and hear each other, engage more deeply, and generally have a richer experience despite not being physically in the same space.

Because the content of a videoconference may be sensitive or personal, some videoconference providers now offer end-to-end (E2E) encryption. In an E2E encrypted videoconference, a host device associated with a host of the videoconference can generate a meeting key (e.g., an encryption/decryption key). The host device can then transmit the meeting key to other participant devices associated with the other participants of the videoconference. The participant devices can use the meeting key to encrypt their respective media streams prior to transmitting them. Additionally, or alternatively, the participant devices can use the meeting key to decrypt the media streams received from the other participant devices. Using the meeting key to encrypt/decrypt the media streams can improve security.

A defining feature of a videoconference that distinguishes it from the asynchronous nature of text messaging is that a videoconference happens in real-time with some or all participants online at the same time. Because of the real-time nature of videoconference, it can be desirable for videoconferences to have a high degree of "liveness". For example, participants should quickly learn of updates to the meeting roster and encryption key, displayed media streams should be recent, and banned participants should promptly lose access to the meeting. But videoconferencing systems often fail to enforce any liveness requirements. When liveness is not sufficiently enforced, it is possible for an attacker to arbitrarily delay communications. For example, if Alice sends a media stream at time t and liveness is not sufficiently enforced, then Bob may receive the media stream at a time that is much later than t, which may pose a significant threat depending on the content of the communication (e.g., if the communication is an instruction to buy or sell a certain stock, then the ability to delay the communication might allow an attacker to front run the instruction). It is also possible for an attacker to prevent or delay certain management actions, such as adding or removing parties from the videoconference, from taking effect.

Some examples of the present disclosure can overcome one or more of the abovementioned problems by enforcing a liveness requirement on a videoconference. In particular, a participant device associated with a participant in a videoconference can sequentially generate strings during the videoconference. The strings can be nonces. The strings may be random strings or otherwise difficult to guess. There can be a relatively small time interval, such as every 15 seconds, between the generation of each new string. After each string is generated, the participant device can transmit the string to a host device associated with a host of the videoconference. The host device can store a copy of the string and, in some examples, maintain a list of strings provided by the participant device. When the host device is going to transmit a communication to the participant device, for example to update the participant device about a new meeting key for use in an end-to-end encryption scheme, the host can incorporate whichever string it most recently received from the participant device into the communication. In some examples, the host can encrypt, sign, or otherwise integrity protect the communication 320. The host device can then transmit the communication with the string to the participant device. Upon receiving the communication, the participant device can compare the string in the communication to its most recently generated string. If the two match, then the client can determine that the communication was generated relatively recently, thereby satisfying the liveness requirement. So, the participant device can accept the communication. If the two do not match, it may mean that the communication was generated too long ago (temporally) to satisfy the liveness requirement. So, the participant device can discard the communication. Using this technique, the participant device can ensure that communications it receives from the host device were transmitted relatively recently from the host device. This can prevent an attacker from performing malicious actions, such as delaying the transmission of a new meeting key from the host device so that participants keep using the old meeting key for longer than is desirable.

In some examples, upon receiving a communication from the host device, the participant device can compare the string in the communication to its most recently generated string as well as its second-most recently generated string. If the string in the communications matches either of those, the participant device can accept the communication. Otherwise, the participant device can discard the communication. Allowing the participant device to accept either the most recent string or the second-most recent string can help prevent race conditions (e.g., in which the participant device attempts to validate the received string at the same time that it generates a new string).

In some examples, the techniques described herein can guarantee the liveness of the meeting keys. For example, each time the host device creates a new meeting key for the videoconferencing meeting, the host device can transmit a communication to the participant device to provide the new meeting key to the participant device. In those communications, the host device can incorporate the strings as described above. Upon receiving each communication, the participant device can validate the string therein. This can help guarantee the liveness of the new meeting key that was provided in the communication and, in turn, that the actual meeting streams are recent.

This illustrative example is given to introduce the reader to the general subject matter discussed herein and the disclosure is not limited to this example. The following sections describe various additional non-limiting examples.

Referring now to FIG. 1, FIG. 1 shows an example of a system 100 that provides videoconferencing functionality to various client devices. The system 100 includes a chat and videoconference provider 110 that is connected to multiple communication networks 120, 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and videoconference provider 110 and manage user authorization for the various services provided by chat and videoconference provider 110. In this example, the authentication and authorization provider 115 is operated by a different entity than the chat and videoconference provider 110, though in some examples, they may be the same entity.

Figure 2:
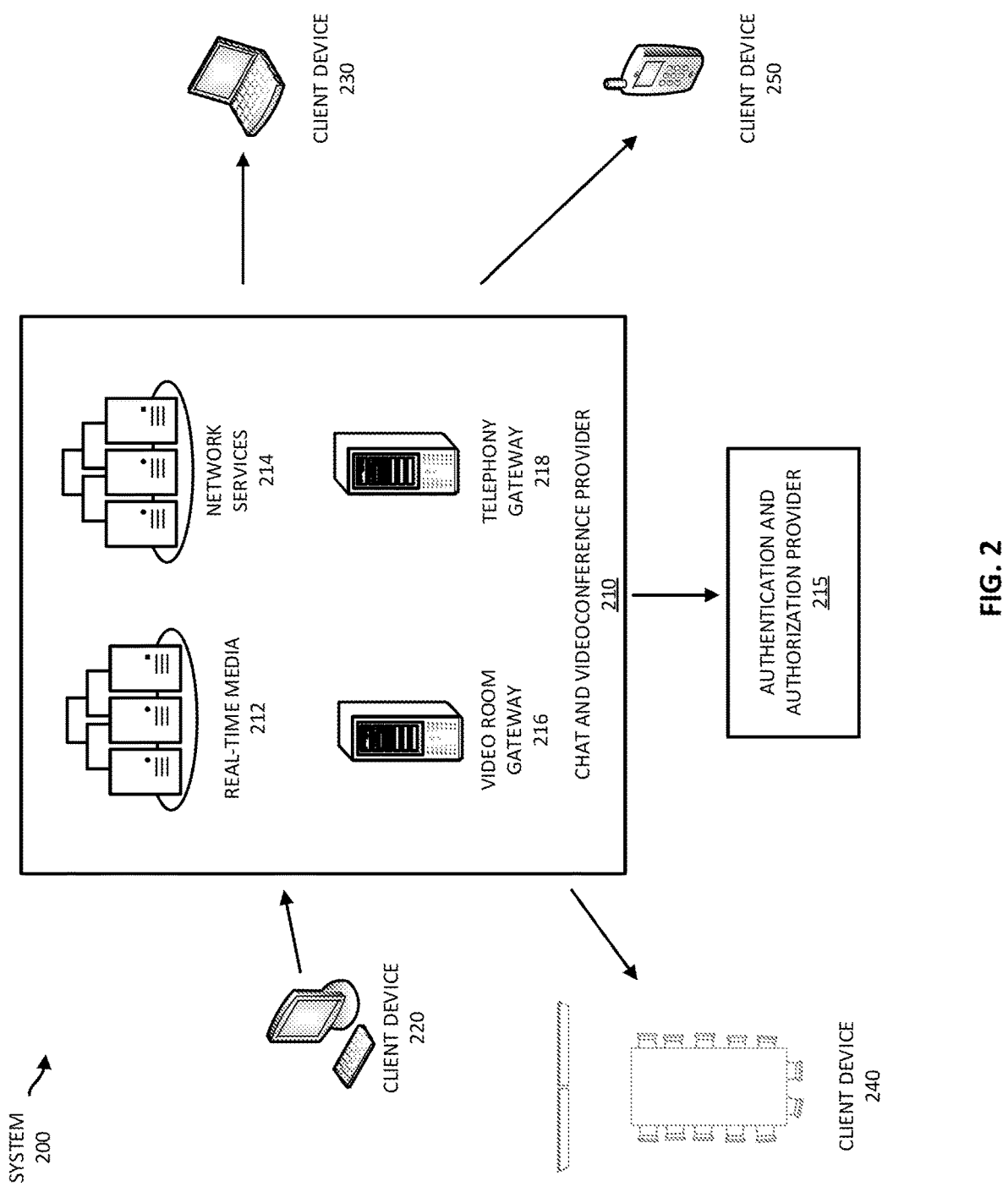
FIG. 2 shows another example of a system for providing videoconferencing and chat functionality to various client devices according to some aspects of the present disclosure.

Chat and videoconference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and videoconference provider 110. It should be understood that the term "meeting" encompasses the term "webinar" used herein.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and videoconference provider 110, a user may contact the chat and videoconference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and videoconference provider 110. They also receive audio or video information from the chat and videoconference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and videoconference provider 110 may also invalidate the meeting information, such as the meeting identifier or password/passcode.

To provide such functionality, one or more client devices 140-180 may communicate with the chat and videoconference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a videoconference meeting hosted by the chat and videoconference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, the client devices 140-160 contact the chat and videoconference provider 110 using network 120 and may provide information to the chat and videoconference provider 110 to access functionality provided by the chat and videoconference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and videoconference provider 110.

An authentication and authorization provider 115 may be any entity trusted by the chat and videoconference provider 110 that can help authenticate a user to the chat and videoconference provider 110 and authorize the user to access the services provided by the chat and videoconference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and videoconference provider 110. The authentication and authorization provider 115 may require the explicit consent of the user before allowing the chat and videoconference provider 110 to access the user's account information for authentication and authorization purposes.

Once the user is authenticated, the authentication and authorization provider 115 may provide the chat and videoconference provider 110 with information about services the user is authorized to access. For instance, the authentication and authorization provider 115 may store information about user roles associated with the user. The user roles may include collections of services provided by the chat and videoconference provider 110 that users assigned to those user roles are authorized to use. Alternatively, more or less granular approaches to user authorization may be used.

When the user accesses the chat and videoconference provider 110 using a client device, the chat and videoconference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide authentication information to authenticate the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and videoconference provider 110, even in cases where the user could authenticate and employ a client device capable of authenticating the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and videoconference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more authentication and authorization providers 215, which can authenticate various users to the chat and videoconference provider 210 generally as described above with respect to FIG. 1.

In this example, the chat and videoconference provider 210 employs multiple different servers (or groups of servers) to provide different examples of videoconference functionality, thereby enabling the various client devices to create and participate in videoconference meetings. The chat and videoconference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received stream, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and videoconference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and videoconference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and videoconference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosted by the chat and videoconference provider 210. Because telephony devices communicate using the PSTN and not using computer networking protocols, such as TCP/IP, the telephony gateway servers 218 act as an interface that converts between the PSTN, and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some videoconference providers may provide more or less functionality than described above and may not separate functionality into different types of servers as discussed above. Instead, any suitable servers and network architectures may be used according to different examples.

Figure 3:
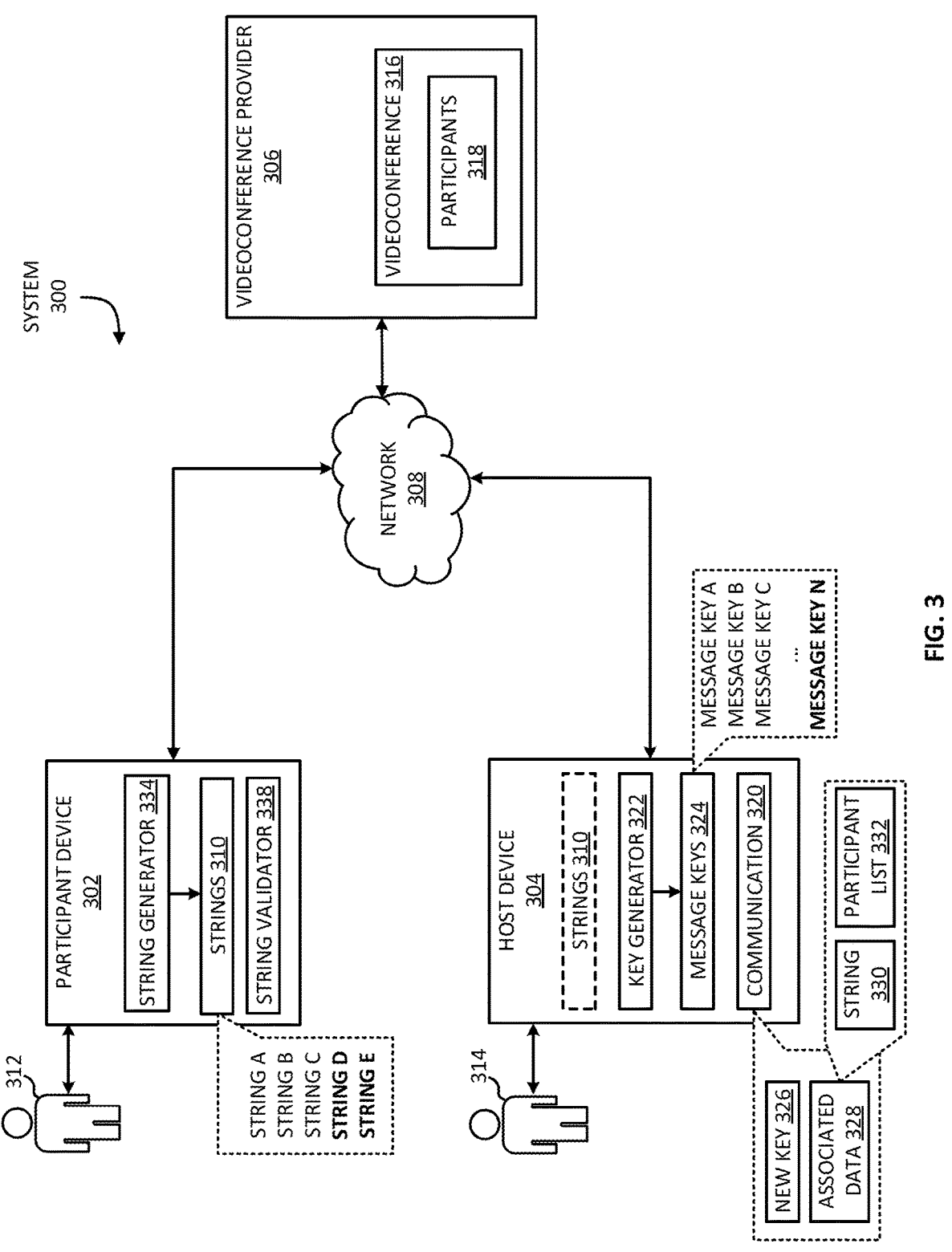
FIG. 3 shows a block diagram of an example of a system for enforcing a liveness requirement on a videoconference according to some aspects of the present disclosure.

Turning now to FIG. 3, shown is a block diagram of an example of a system 300 for enforcing a liveness requirement on a videoconference 316 according to some aspects of the present disclosure. The system 300 includes a participant device 302 (e.g., any of the client devices described above) associated with a participant 312 of the videoconference 316. While only one participant device 302 is shown for simplicity, and the following description is from the perspective of that participant device 302, it will be appreciated that the system 300 can include any number of participant devices performing the techniques described herein.

The system 300 also includes a host device 304 (e.g., any of the client devices described above) associated with a host 314 of the videoconference 316. The participant device 302 and the host device 304 can each execute a videoconferencing application to engage in the videoconference 316 via one or more networks 308, such as the Internet. The videoconference 316 can be facilitated by a videoconference provider 306, such as the chat and videoconference providers 110, 210. For example, the videoconference provider 306 can route messages back-and-forth between the participant device 302 and the host device 304 via the one or more networks 308, generate and store recordings and transcripts of the videoconference 316, and perform other functions.

The participant device 302 includes a string generator 334 configured to generate one or more strings 310. The string generator 334 may be software, hardware, or a combination thereof. In some examples, the string generator 334 can be a random string generator, so that the strings 310 are random or pseudorandom strings. The strings 310 can each include letters, numbers, special characters, symbols, or characters represented by a standardized character set, e.g., any Unicode character. Each of the strings 310 can be of a sufficient length and/or entropy to make it hard to guess. The participant device 302 can execute the string generator 334 repeatedly over the course of the videoconference 316 to generate any number of strings 310. The strings 310 can be nonces that are generated for the specific use described herein. In the example shown in FIG. 3, the participant device 302 has generated five strings so far over the course of the videoconference 316, with String A being the oldest and String E being the newest. After generating each of the strings 310, the participant device 302 can transmit the string 310 to the host device 304. For example, the participant device 302 can transmit the string 310 to the videoconference provider 306, which can route it to the host device 304.

Between every consecutive pair of strings that are generated by the string generator 334, there is a time interval (e.g., a delay). The time interval can be a fixed interval, such as 10 seconds, so that the strings 310 are periodically generated at that fixed interval. Alternatively, the time interval can be a dynamic interval that can be adjusted by the participant device 302 over the course of the videoconference 316 based on one or more factors, such as the number of participants 318 in the videoconference 316. For example, the participant device 302 can employ a first time interval based on a first number of participants 318 in the videoconference 316 at a first point in time. And the participant device 302 can employ a second time interval based on a second number of participants 318 in the videoconference 316 a second point in time, where the second time interval is different than the first time interval. In some examples, the dynamic interval can scale with the number of participants 318 in the videoconference 316, so that the dynamical interval is longer when there are more participants 318 in the videoconference 316 and shorter when there are fewer participants 318 in the videoconference 316. For instance, the dynamic interval can be proportional (e.g., linearly or non-linearly proportional) to the number of participants 318 in the videoconference 316. Because each of the participant devices in the videoconference 316 may transmit each of its generated strings to the host device 304, increasing the time interval between string generations in response to an increase in the number of participants can reduce the total number of transmissions to the host device 304, which can avoid overwhelming the host device 304.

The host device 304 can receive the strings 310 (e.g., sequentially) from the participant device 302 and store some or all of them. For example, the host device 304 can may only store the most recent string from the participant device 302. Alternatively, the host device 304 can store some or all of the strings 310 in a list that is specific to the participant device 302. This can allow the host device 304 to maintain separate lists of strings corresponding to each of the participant devices.

At various points during the videoconference, the host device 304 can transmit communications to the participant device 302. For example, the host device 304 can transmit media streams, notifications of management actions (e.g., adding or removing a participant), or messages to the videoconference provider 306, which can forward them to the participant device 302. When generating a communication 320 for the participant device 302, the host device 304 can determine which string or list of strings corresponds to the participant device 302. If the host device 304 is storing a list of strings, the host device 304 can then determine which string on the list was most recently received from the participant device 302. After determining the most recently received string 330 from the participant device 302, the host device 304 can incorporate that string 330 and optionally other information into the communication 320. In some examples, the communication 320 can be encrypted or otherwise integrity protected by the host device 304. The host device 304 can then transmit the communication 320 to the participant device 302.

As one particular example, the host device 304 can execute a key generator 322 to generate message keys 324. The key generator 322 may be software, hardware, or a combination thereof. The message keys 324 may be encryption keys usable to encrypt and decrypt communications between the participants in the videoconference 316, for example to facilitate end-to-end encryption of the videoconference 316. The host device 304 may generate a new message key 326 at periodic intervals during the videoconference 316. Additionally, or alternatively, the host device 304 can generate a new message key 326 in response to one or more videoconference events, such as a participant leaving the videoconference 316. In the example shown in FIG. 3, the host device 304 has generated five message keys so far over the course of the videoconference 316, with Message Key A being the oldest and Message Key N being the newest. After the host device 304 generates a new message key 326, the host device 304 can include the new message key 326 in a communication 320 destined for the participant device 302. The host device 304 can also include associated data 328 in the communication 320. The associated data 328 may include the most recently received string 330 from the participant device 302 as well as other information. The other information may include, for example, a current participant list 332 for the videoconference 316 (e.g., the current list of participants 318 in the videoconference 316). After generating the communication 320, the host device 304 can encrypt or otherwise integrity protect the communication 320. The host device 304 can then transmit the communication 320 to the participant device 302.

The participant device 302 can receive the communication 320 and execute a string validator 338 to validate the string 330 in the communication 320. The string validator 338 may be software, hardware, or a combination thereof. The string validator 338 can extract the string 330 from the communication 320 and compare the string 330 to its most recently generated string (e.g., String E). If the two match, it may mean that the communication 320 was sent relatively recently and thus that its information is up-to-date. So, the participant device 302 can accept the communication 320. Accepting the communication 320 can involve using the other non-string information in the communication 320 for one or more purposes. For example, the participant device 302 can extract the new message key 326 from the communication 320 and use it to encrypt or decrypt subsequent communications. As another example, the participant device 302 can extract the participant list 332 from the communication 320 and use it to update a meeting roster in its videoconference interface. On the other hand, if the two strings do not match, the string validator 338 may next compare the string 330 to its second-most recently generated string (e.g., String D). If the two match, the participant device 302 can accept the communication 320. Otherwise, the participant device 302 can reject (e.g., discard) the communication 320. The participant device 302 can reject the communication 320 because the communication 320 is considered too old to satisfy the liveness requirement. By applying these techniques, the participant device 302 can ensure that any communications it receives from the host device 304 were transmitted relatively recently and therefore carry up-to-date information, thereby preventing man-in-the-middle attacks and other problems.

Similar principles may also be applied to communications between participant devices other than the host device. For example, the participant device 302 can transmit the strings 310 to some or all of the other non-host participant devices in the videoconference 316, which could keep track of the strings 310 as described above. The participant device 302 could then validate communications from those other participant devices using the techniques described above.

Figure 4:
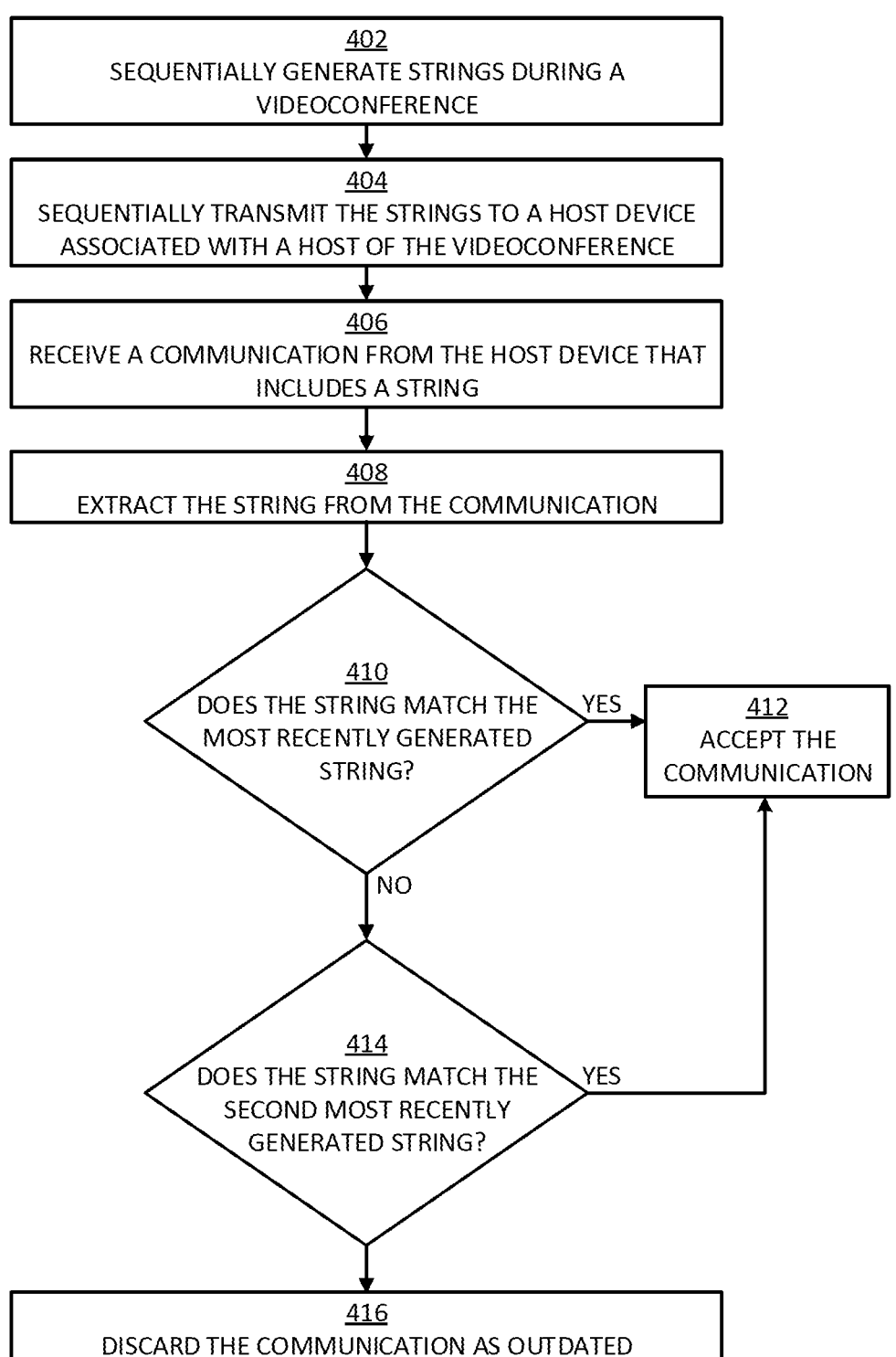
FIG. 4 shows a flowchart of an example of a process for enforcing a liveness requirement on a videoconference according to some aspects of the present disclosure.

FIG. 4 shows a flowchart of an example of a process for enforcing a liveness requirement on a videoconference according to some aspects of the present disclosure. Other examples may include more operations, fewer operations, different operations, or a different order of operations. The operations of FIG. 4 will now be described below with reference to the components of FIG. 3 above.

In block 402, a participant device 302 associated with a participant of a videoconference 316 sequentially generates strings 310 during the videoconference 316. The videoconference 316 may be an end-to-end encrypted videoconference. The participant device 302 can execute a string generator 334 to generate the strings 310. There may be a fixed time interval or a dynamically adjustable time interval between each consecutive pair of strings that are generated.

In block 404, the participant device 302 sequentially transmits the strings 310 to a host device 304 associated with a host of the videoconference 316. For example, the participant device 302 can transmit the strings 310 to the host device 304 via one or more networks 308, such as the Internet. Each of the strings 310 can be individually transmitted shortly after its generation.

In block 406, the participant device 302 receives a communication 320 from the host device 304. For example, the participant device 302 can receive the communication 320 from the videoconference provider 306, which in turn can receive the communication 320 from the host device 304. The communication 320 includes a string 330. The communication 320 may also include other information, such as a message key 326 and a participant list 332 associated with the videoconference 316.

In some examples, the communication 320 can be integrity protected. If the communication 320 is integrity protected, the participant device 302 can attempt to verify the communication 320 (e.g., decrypt the communication 320 or verify a signature with which the communication 320 is signed) prior to using it. If the communication 320 cannot be verified, it may be discarded by the participant device 302.

In block 408, the participant device 302 extracts the string 330 from the communication 320. For example, the participant device 302 can execute a string validator 338 to extract and validate the string 330. Validating the string 330 can involve comparing the string 330 in the communication 320 to one or more of the strings 310 generated by the participant device 302.

In block 410, the participant device 302 determines whether the string 330 matches the most recently generated string in the set of strings 310 generated by the participant device 302. The most recently generated string is whichever string was most recently generated in time by the participant device 302. If the string 330 matches the most recently generated string (e.g., String E), then the process can move to block 412 where the participant device 302 can accept the communication 320. Otherwise, the process can continue to block 414.

At block 414, the participant device 302 determines whether the string 330 matches the second-most recently generated string in the set of strings 310 generated by the participant device 302. The second-most recently generated string is whichever string was generated by the participant device 302 immediately prior to the most recently generated string. If the string 330 matches the second-most recently generated string (e.g., String D), then the process can continue to block 412 where the participant device 302 can accept the communication 320. Otherwise, the process can continue to block 416.

In block 416, the participant device 302 discards the communication 320 (e.g., the rest of the data inside the communication 320) as outdated. In some examples, the participant device 302 can transmit an output (e.g., an error message) indicating that an outdated communication was received, to notify the user 312 of a potential problem. The participant device 302 may also transmit a response to the communication 320 to the host device 304. The response can be configured to notify the host device 304 that the communication 320 was rejected (e.g., because it was outdated).

While the process shown in FIG. 4 allows for either the most-recent string or the second-most recent string to be used to validate the string 330 in the communication 320, in other examples a larger or smaller number of the previously generated strings 310 may be used in the validation process. For instance, in some examples the string validator 338 may only use the most-recent string in the validation process. And in other examples, the string validator 338 can be configured to compare the string 330 to three or more of the previously generated strings 310 to detect a match. The number of strings 310 used in the validation process may be a manually- or automatically-configurable setting. The configuration of the setting can depend on one or more factors, such as the latency of the network 308 and the frequency with which new strings are generated by the participant device 302.

As noted earlier, in some examples the participant device 302 can dynamically adjust the frequency at which the strings 310 are generated over the course of the videoconference 316. FIG. 5 shows a flowchart of an example of a process for dynamically adjusting this frequency according to some aspects of the present disclosure. Other examples may include more operations, fewer operations, different operations, or a different order of operations. The operations of FIG. 5 will now be described below with reference to the components of FIG. 3 above.

In block 502, a participant device 302 determines a first time interval based on a first number of participants 318 in a videoconference 316. In some examples, the participant device 302 may determine the first number of participants 318 based on a participant list 332 included in a communication 320 from a host device 304. And in some examples, the participant device 302 can determine the first time interval based on an equation that relates the first time interval to the number of participants 318 in the videoconference 316.

In block 504, the participant device 302 generates one or more strings at the first time interval. This can involve waiting for the first time interval between generating two consecutive strings.

In block 506, the participant device 302 detects a change in the number of participants 318 in the videoconference 316. For example, the participant device 302 can receive another communication from the host device 304, where the communication includes an updated participant list that has more or fewer participants than the prior participant list 332.

In block 508, the participant device 302 determines a second time interval based on a second number of participants 318 in the videoconference 316. In some examples, the participant device 302 may determine the second number of participants 318 based on the updated participant list included in the other communication from the host device

304. The participant device 302 may determine the second time interval using any of the techniques described above.

In block 510, the participant device 302 generates one or more strings at the second time interval. This can involve waiting for the second time interval between generating two consecutive strings.

FIG. 6 shows a flowchart of an example of a process for generating a communication with a string according to some aspects of the present disclosure. Other examples may include more operations, fewer operations, different operations, or a different order of operations. The operations of FIG. 6 will now be described below with reference to the components of FIG. 3 above.

In block 602, a host device 304 determines a participant device 302 to which to transmit a communication 320 during a videoconference 316. For example, the host device 304 can determine that it has not already transmitted a new message key 326 to the participant device 302 and, as a result, determine that it needs to transmit the communication 320 containing the new message key 326 to the participant device 302.

In block 604, the host device 304 determines a list of strings received from the participant device 302 during the videoconference 316. The list of strings can include one string or multiple strings. The host device 304 can store a respective list of strings received from each of the participant devices during the videoconference 316 and access the corresponding list depending on the participant device with which it intends to communicate.

In block 606, the host device 304 can determine a most recent string in the list of strings. The most recent string can be whichever string was received most recently in time from the participant device 302. In some examples, the host device 304 can determine which string in the list of strings is the most recent string based on each string's location in the list (e.g., the newest string may be appended to the end of the list). Alternatively, the host device 304 can determine which string in the list of strings is the most recent string based on a respective timestamp stored in relation to each string on the list.

In block 608, the host device 304 includes the most recent string 330 in the communication 320. For example, the host device 304 can encrypt, sign, or otherwise integrity protect the most recent string 330 in the communication 320. The host device 304 may also include other information in the communication 320. For example, in block 610, the host device 304 can include a new message key 326 for encrypting a videoconference in the communication 320. As another example, in block 612, the host device 304 can include a participant list 332 (e.g., a current list of videoconference participants) in the communication 320.

In block 614, the host device 304 transmits the communication 320 to the participant device 302. For example, the host device 304 can transmit the communication 320 to the videoconference provider 306 via the one or more networks 308. The videoconference provider 306 can then forward the communication 320 to the participant device 302 via the one or more networks 308.

Figure 7:
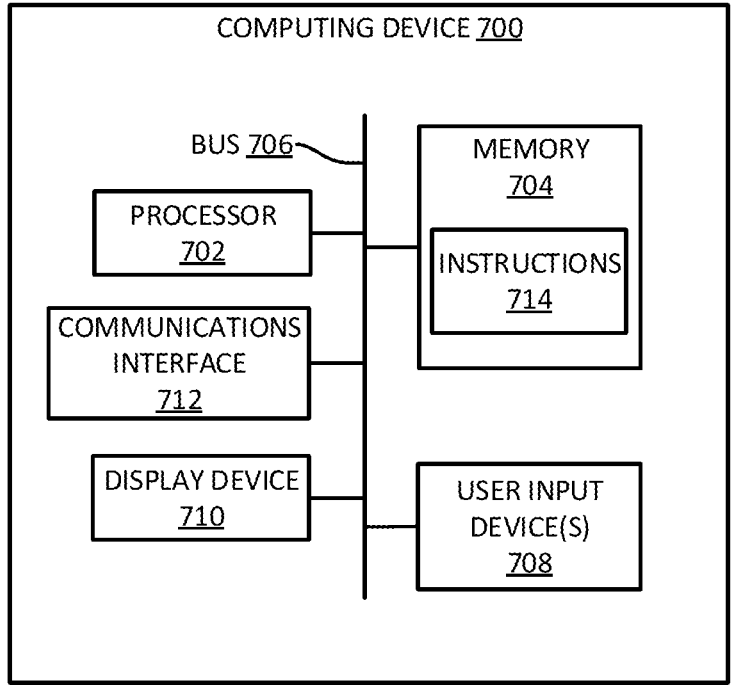
FIG. 7 shows a block diagram of an example of a computing device usable to implement some aspects of the present disclosure.

Turning now to FIG. 7, shown is a block diagram of an example of a computing device 700 usable to implement some aspects of the present disclosure. In some examples, the computing device 700 may correspond to any of the client devices or videoconference providers described above.

The computing device 700 includes a processor 702 that is in communication with the memory 704 and other components of the computing device 700 using one or more communications buses 706. The processor 702 is configured to execute processor-executable instructions 714 stored in the memory 704 to perform one or more processes described herein.

As shown, the computing device 700 also includes one or more user input devices 708 (e.g., a keyboard, mouse, touchscreen, video capture device, and/or microphone) to accept user input and the display device 710 to provide visual output to a user. The computing device 700 further includes a communications interface 712. In some examples, the communications interface 712 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method comprising: sequentially generating, by a client device, strings during a videoconference; sequentially transmitting, by the client device, the strings to a host device associated with a host of the videoconference, the host device being remote from the client device; receiving, by the client device, a communication from the host device during the videoconference; determining, by the client device, whether the communication includes a most recently generated string among the strings; and based on determining that the communication excludes the most recently generated string, discarding, by the client device, the communication as outdated.

Example #2: The method of Example #1, further comprising: sequentially generating, by the client device, the strings using a random string generator, the strings being random or pseudorandom strings.

Example #3: The method of any of Examples #1-2, wherein the videoconference is an end-to-end encrypted videoconference, and wherein the communication includes a new message key that is different from a prior message key used to encrypt the videoconference.

Example #4: The method of any of Examples #1-3, wherein the communication includes a list of participants in the videoconference, and further comprising: based on determining that the communication excludes the most recently generated string, discarding, by the client device, the list of participants as outdated.

Example #5: The method of any of Examples #1-4, further comprising: determining, by the client device, that the communication excludes both the most recently generated string and a second-most recently generated string among the strings; and in response to determining that the communication excludes both the most recently generated string and a second-most recently generated string, discarding, by the client device, the communication as outdated.

Example #6: The method of any of Examples #1-5, wherein the communication is a first communication, and further comprising: receiving, by the client device, a second communication from the host device during the videoconference; determining, by the client device, whether the second communication includes the most recently generated string or a second-most recently generated string among the strings; and based on determining that the second communication includes the most recently generated string or the second-most recently generated string, using, by the client device, a key in the second communication to encrypt the videoconference.

Example #7: The method of Example #6, further comprising: determining, by the client device, that the second communication excludes the most recently generated string and includes the second-most recently generated string; and based on determining that the second communication excludes the most recently generated string and includes the second-most recently generated string, using, by the client device, the key to encrypt the videoconference.

Example #8: The method of Example #6, wherein the second communication includes a list of participants in the videoconference, and further comprising: based on determining that the second communication includes the most recently generated string or the second-most recently generated string, determining, by the client device, that the list of participants is up-to-date.

Example #9: The method of any of Examples #1-8, wherein sequentially generating the strings involves generating the strings at a fixed interval throughout the videoconference.

Example #10: The method of any of Examples #1-9, wherein sequentially generating the strings involves generating the strings at a dynamic interval that is adjusted at least once during the videoconference based on a number of participants in the videoconference.

Example #11: A system comprising: one or more processors; and one or more memories including instructions that are executable by the one or more processors to cause the one or more processors to perform operations comprising: sequentially generating strings during a videoconference; sequentially transmitting the strings to a host device associated with a host of the videoconference; receiving a communication from the host device during the videoconference; determining whether the communication includes a most recently generated string among the strings; and based on determining that the communication excludes the most recently generated string, discarding the communication as outdated.

Example #12: The system of Example #11, wherein the operations further comprise: sequentially generating the strings using a random string generator, the strings being random or pseudorandom strings.

Example #13: The system of any of Examples #11-12, wherein the videoconference is an end-to-end encrypted videoconference, and wherein the communication includes a new message key that is different from a prior message key used to encrypt the videoconference.

Example #14: The system of any of Examples #11-13, wherein the communication includes a list of participants in the videoconference, and wherein the operations further comprise: based on determining that the communication excludes the most recently generated string, discarding the list of participants as outdated.

Example #15: The system of any of Examples #11-14, wherein the operations further comprise: determining that the communication excludes both the most recently generated string and a second-most recently generated string among the strings; and in response to determining that the communication excludes both the most recently generated string and a second-most recently generated string, discarding the communication as outdated.

Example #16: The system of any of Examples #11-15, wherein the communication is a first communication that includes a first key and first associated data, and wherein the operations further comprise: receiving a second communication from the host device during the videoconference, the second communication including a second key and second associated data, the second key being different from the first key; determining whether the second associated data includes the most recently generated string or a second-most recently generated string among the strings; and based on determining that the second associated data includes the most recently generated string or the second-most recently generated string, using the second key to encrypt the videoconference.

Example #17: The system of Example #16, wherein the operations further comprise determining that the second associated data excludes the most recently generated string and includes the second-most recently generated string; and based on determining that the second associated data excludes the most recently generated string and includes the second-most recently generated string, using the second key to encrypt the videoconference.

Example #18: The system of Example #16, wherein the second communication includes a list of participants in the videoconference, and wherein the operations further comprise: based on determining that the second associated data includes the most recently generated string or the second-most recently generated string, determining that the list of participants is up-to-date.

Example #19: The system of any of claims #11-18, wherein sequentially generating the strings involves generating the strings at a dynamic interval that is adjusted at least once during the videoconference based on a number of participants in the videoconference.

Example #20: A non-transitory computer-readable medium comprising program code that is executable by one or more processors to cause the one or more processors to perform operations including: sequentially generating strings during a videoconference; sequentially transmitting the strings to a host device associated with a host of the videoconference; receiving a communication from the host device during the videoconference; determining whether the communication includes a most recently generated string among the strings; and based on determining that the communication excludes the most recently generated string, discarding the communication as outdated.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
    iteratively generating, by a client device, strings during a videoconference;
    iteratively transmitting, by the client device, the strings to a host device associated with a host of the videoconference, the host device being remote from the client device;
    receiving, by the client device, a communication from the host device during the videoconference, wherein the communication includes a string selected from among the strings by the host device;
    determining, by the client device, whether the string provided in the communication corresponds to a most recently generated string among the strings; and based on determining that the string provided in the communication does not correspond to the most recently generated string, discarding, by the client device, the communication as outdated while maintaining a connection to the videoconference.

2. The method of claim 1, further comprising:

iteratively generating, by the client device, the strings using a random string generator, the strings being random or pseudorandom strings.

3. The method of claim 1, wherein the videoconference is an end-to-end encrypted videoconference, and wherein the communication further includes a new message key that is different from a prior message key used to encrypt the videoconference.

4. The method of claim 1, wherein the communication further includes a list of participants in the videoconference, and further comprising:

based on determining that the communication excludes the most recently generated string, discarding, by the client device, the list of participants as outdated.

5. The method of claim 1, further comprising:

determining, by the client device, that the communication excludes both the most recently generated string and a second-most recently generated string among the strings; and in response to determining that the communication excludes both the most recently generated string and a second-most recently generated string, discarding, by the client device, the communication as outdated.

6. The method of claim 1, wherein the communication is a first communication, and further comprising:

receiving, by the client device, a second communication from the host device during the videoconference;

determining, by the client device, whether the second communication includes the most recently generated string or a second-most recently generated string among the strings; and based on determining that the second communication includes the most recently generated string or the second-most recently generated string, using, by the client device, a key in the second communication to encrypt the videoconference.

7. The method of claim 6, further comprising:

determining, by the client device, that the second communication excludes the most recently generated string and includes the second-most recently generated string; and based on determining that the second communication excludes the most recently generated string and includes the second-most recently generated string, using, by the client device, the key to encrypt the videoconference.

8. The method of claim 6, wherein the second communication includes a list of participants in the videoconference, and further comprising:

based on determining that the second communication includes the most recently generated string or the second-most recently generated string, determining, by the client device, that the list of participants is up-to-date.

9. The method of claim 1, wherein iteratively generating the strings involves generating the strings at a fixed interval throughout the videoconference.

10. The method of claim 1, wherein iteratively generating the strings involves generating the strings at a dynamic interval that is adjusted at least once during the videoconference based on a number of participants in the videoconference.

11. A system comprising:

one or more processors; and one or more memories including instructions that are executable by the one or more processors to cause the one or more processors to perform operations comprising:

iteratively generating strings during a videoconference;

iteratively transmitting the strings to a host device associated with a host of the videoconference;

receiving a communication from the host device during the videoconference, wherein the communication includes a string selected from among the strings by the host device;

determining whether the string provided in the communication corresponds to a most recently generated string among the strings; and based on determining that the string provided in the communication does not correspond to the most recently generated string, discarding the communication as outdated while maintaining a connection to the videoconference.

12. The system of claim 11, wherein the operations further comprise:

iteratively generating the strings using a random string generator, the strings being random or pseudorandom strings.

13. The system of claim 11, wherein the videoconference is an end-to-end encrypted videoconference, and wherein the communication includes a new message key that is different from a prior message key used to encrypt the videoconference.

14. The system of claim 11, wherein the communication includes a list of participants in the videoconference, and wherein the operations further comprise:

based on determining that the communication excludes the most recently generated string, discarding the list of participants as outdated.

15. The system of claim 11, wherein the operations further comprise:

determining that the communication excludes both the most recently generated string and a second-most recently generated string among the strings; and in response to determining that the communication excludes both the most recently generated string and a second-most recently generated string, discarding the communication as outdated.

16. The system of claim 11, wherein the communication is a first communication that includes a first key and first associated data, and wherein the operations further comprise:

receiving a second communication from the host device during the videoconference, the second communication including a second key and second associated data, the second key being different from the first key;

determining whether the second associated data includes the most recently generated string or a second-most recently generated string among the strings; and based on determining that the second associated data includes the most recently generated string or the second-most recently generated string, using the second key to encrypt the videoconference.

17. The system of claim 16, wherein the operations further comprise:

determining that the second associated data excludes the most recently generated string and includes the second-most recently generated string; and based on determining that the second associated data excludes the most recently generated string and includes the second-most recently generated string, using the second key to encrypt the videoconference.

18. The system of claim 16, wherein the second communication includes a list of participants in the videoconference, and wherein the operations further comprise:

based on determining that the second associated data includes the most recently generated string or the second-most recently generated string, determining that the list of participants is up-to-date.

19. The system of claim 11, wherein iteratively generating the strings involves generating the strings at a dynamic interval that is adjusted at least once during the videoconference based on a number of participants in the videoconference.

20. A non-transitory computer-readable medium comprising program code that is executable by one or more processors to cause the one or more processors to perform operations including:

iteratively generating strings during a videoconference;

iteratively transmitting the strings to a host device associated with a host of the videoconference;

receiving a communication from the host device during the videoconference;

determining whether the communication includes a most recently generated string among the strings; and based on determining that the communication excludes the most recently generated string, discarding the communication as outdated while maintaining a connection to the videoconference.

* * * * *